(12) United States Patent
Hsu et al.

(10) Patent No.: US 11,073,386 B2
(45) Date of Patent: *Jul. 27, 2021

(54) SENSING ELEMENT AND OPTICAL DISTANCE MEASUREMENT SYSTEM

(71) Applicant: PixArt Imaging Inc., Hsin-Chu County (TW)

(72) Inventors: En-Feng Hsu, Hsin-Chu County (TW); Chia-Yu Liu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 366 days.

This patent is subject to a terminal disclaimer.

(21) Appl. No.: 16/157,328

(22) Filed: Oct. 11, 2018

(65) Prior Publication Data

US 2019/0041204 A1  Feb. 7, 2019

Related U.S. Application Data

(63) Continuation of application No. 15/080,679, filed on Mar. 25, 2016, now Pat. No. 10,139,223.

(30) Foreign Application Priority Data

Apr. 22, 2015 (TW) .................. 104112987

(51) Int. Cl.
*G01C 3/08* (2006.01)
*G06F 3/03* (2006.01)
*G06F 3/01* (2006.01)

(52) U.S. Cl.
CPC ............... *G01C 3/08* (2013.01); *G06F 3/017* (2013.01); *G06F 3/0304* (2013.01)

(58) Field of Classification Search
CPC . B60W 30/08; B60W 2420/52; G01S 17/936; G01S 17/023; G01S 7/4818; G01S 7/4813; B62D 15/0265; B60T 7/22
See application file for complete search history.

(56) References Cited

U.S. PATENT DOCUMENTS

| 2012/0044406 A1* | 2/2012 | Shimoda | H01L 27/14627 348/345 |
| 2014/0176771 A1* | 6/2014 | Itou | H01L 27/14627 348/308 |
| 2018/0109768 A1* | 4/2018 | Murata | H04N 5/36961 |

* cited by examiner

*Primary Examiner* — Luke D Ratcliffe
(74) *Attorney, Agent, or Firm* — Hauptman Ham, LLP

(57) ABSTRACT

A sensing element includes a plurality of sensing pixel areas arranged in matrix, wherein each of the plurality of sensing pixel areas includes a first pixel, a second pixel, a first shielding layer, a second shielding layer and at least one micro lens. The second pixel is adjacent to the first pixel in a predetermined direction. The first shielding layer is disposed on the first pixel and has a first opening, wherein an aperture of the first opening increases along the predetermined direction from a center of the first pixel. The second shielding layer is disposed on the second pixel and has a second opening, wherein a shape of the second opening is mirror symmetrical with that of the first opening in the predetermined direction. The at least one micro lens is disposed on the first shielding layer and the second shielding layer.

19 Claims, 9 Drawing Sheets

SENSING ELEMENT AND OPTICAL DISTANCE MEASUREMENT SYSTEM

CROSS REFERENCE TO RELATED APPLICATION

This application is a continuation application of U.S. application Ser. No. 15/080,679, filed on Mar. 25, 2016, which claims the priority benefit of Taiwan Patent Application Ser. No. 104112987, filed on Apr. 22, 2015, the full disclosure of which is incorporated herein by reference.

BACKGROUND

1. Field of the Disclosure

This disclosure generally relates to a sensing element, more particularly, to a sensing element an optical distance measurement system applicable to the distance measurement or the gesture recognition.

2. Description of the Related Art

In general, a distance measurement system employs a light source and calculates an object distance according to the energy of light beam of the light source reflected back by the object. Traditionally, it is able to use the triangulation method or time-of-flight (TOF) technique to calculate the distance. However, these methods require a higher cost and a larger system size.

In addition, the development of gesture recognition generally removes the background image at first by using a 3D image so as to separate the object image. In this technique, two image sensors are used such that the size and cost of a gesture recognition module can not be effectively reduced.

As mentioned above, the present disclosure obtains the 3D image by using the phase detection, and an additional illumination light (as used in the TOF mentioned above) is not necessary. In the proposed technique of the present disclosure, a single image sensor is employed to be able to implement the distance measurement and the gesture recognition.

SUMMARY

Accordingly, the present disclosure provides a sensing element and an optical distance measurement system with a low cost, small size and high detection accuracy.

The present disclosure provides a sensing element including a plurality of sensing pixel areas, wherein each of the sensing pixel areas includes a first pixel, a second pixel, a first shielding layer, a second shielding layer and at least one micro lens. The second pixel is adjacent to the first pixel. The first shielding layer is disposed upon the first pixel and has a first opening, wherein an aperture of the first opening increases along a predetermined direction from a center of the first pixel. The second shielding layer is disposed upon the second pixel and has a second opening, wherein a shape of the second opening is mirror symmetrical to that of the first opening along the predetermined direction. The at least one micro lens is disposed upon the first shielding layer and the second shield layer, wherein the first pixel and the second pixel respectively receive incident light beams of different phases.

The present disclosure further provides an optical distance measurement system including a lens, a sensing element and a processing unit. The sensing element senses light penetrating the lens and outputs an image frame, and includes a plurality of sensing pixel areas, wherein each of the sensing pixel areas includes a first pixel, a second pixel, a first shielding layer, a second shielding layer and at least one micro lens. The first shielding layer is disposed upon the first pixel and having a first opening, wherein an aperture of the first opening increases along a first direction from a center of the first pixel. The second shielding layer is disposed upon the second pixel and having a second opening, wherein an aperture of the second opening increases along an inverse direction of the first direction from a center of the second pixel. The at least one micro lens is disposed between the lens and the first shielding layer as well as the second shielding layer. The processing unit generates, according to the image frame, a first subframe corresponding to the first pixels and a second subframe corresponding to the second pixels, and estimates a plurality of distances of different positions, according to the first subframe and the second subframe, on a surface of an object to obtain a three-dimensional image of the object.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
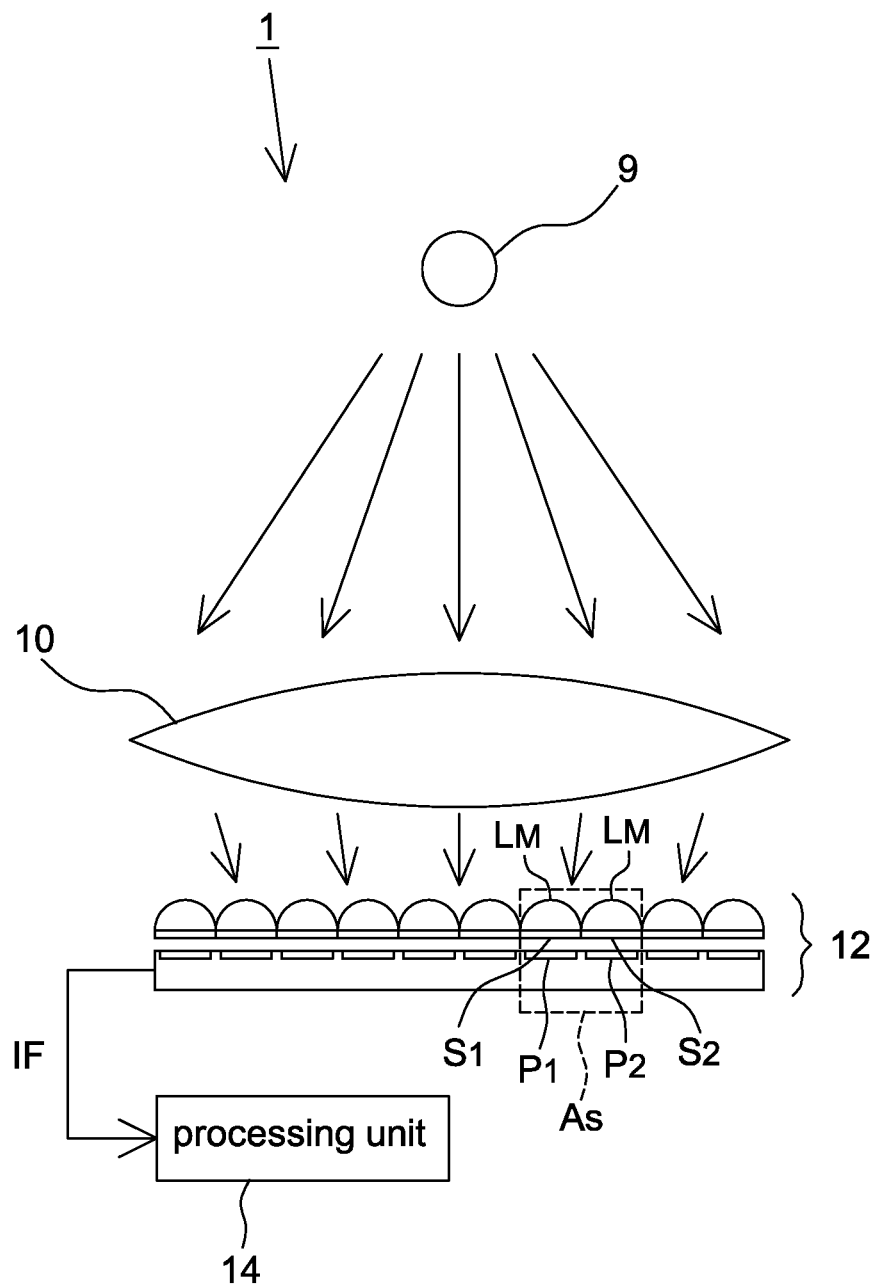
FIG. 1 is a schematic diagram of an optical distance measurement system according to a first embodiment of the present disclosure.

Referring to FIG. 1, it is a schematic diagram of an optical distance measurement system 1 according to a first embodiment of the present disclosure. The optical distance measurement system 1 includes a lens 10, a sensing element 12 and a processing unit 14. In this embodiment, the optical distance measurement system 1 is used to estimate at least one object distance. For example, when an object 9 enters a valid detection range of the optical distance measurement system 1, the optical distance measurement system 1 estimates at least one distance of the object 9 with respect to the optical distance measurement system 1 (described later).

It should be mentioned that FIG. 1 shows only one object (e.g. the object 9) for illustrating the present disclosure, but not limited thereto. In some embodiments, the distance of each of a plurality of objects within the valid detection range of the optical distance measurement system 1 is able to be estimated. In some embodiments, the object 9 has a rough surface, and the optical distance measurement system 1 estimates a plurality of distances, with respect to the optical distance measurement system 1, of different positions on the rough surface of the object 9 to obtain three-dimensional image information.

The lens 10 is used to condense light, e.g., reflected light from the object 9. The lens 10 is separated, e.g., via a spacer, but not limited to, from the sensing element 12 by a fixed distance. In other embodiments, the lens 10 keeps the fixed distance from the sensing element 12 by a casing or a supporting member. In addition, although FIG. 1 shows one lens 10, the present disclosure is not limited thereto. In other embodiments, the lens 10 is a lens set including a plurality of lenses.

The sensing element 12 is used to capture light penetrating the lens 10 and output an image frame IF. The sensing element 12 is, e.g., a charge coupled device (CCD) image sensor, a complementary metal oxide semiconductor (CMOS) image sensor or other sensors for sensing light energy. The sensing element 12 includes a plurality of sensing pixel areas As arranged in a matrix, wherein each of the sensing pixel areas As includes a first pixel $P_1$, a second pixel $P_2$, a first shielding layer $S_1$, a second shielding layer $S_2$ and at least one micro lens $L_M$.

Figure 2A:
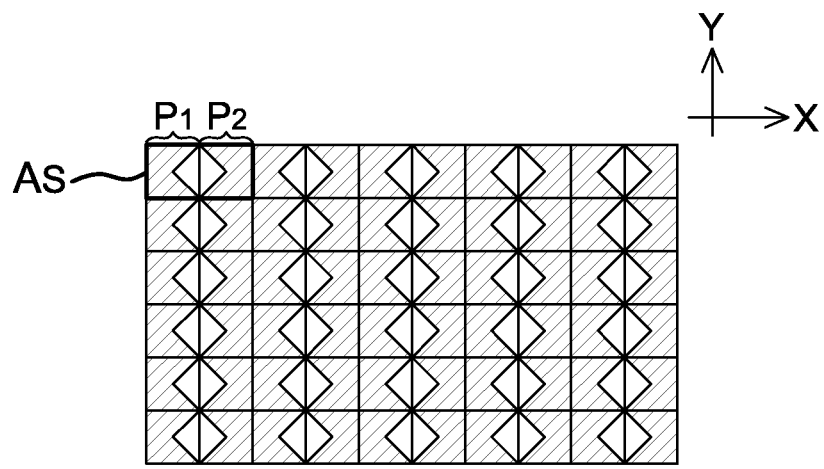
FIG. 2A is a top view of a sensing element of the optical distance measurement system of FIG. 1.
Figure 2B:
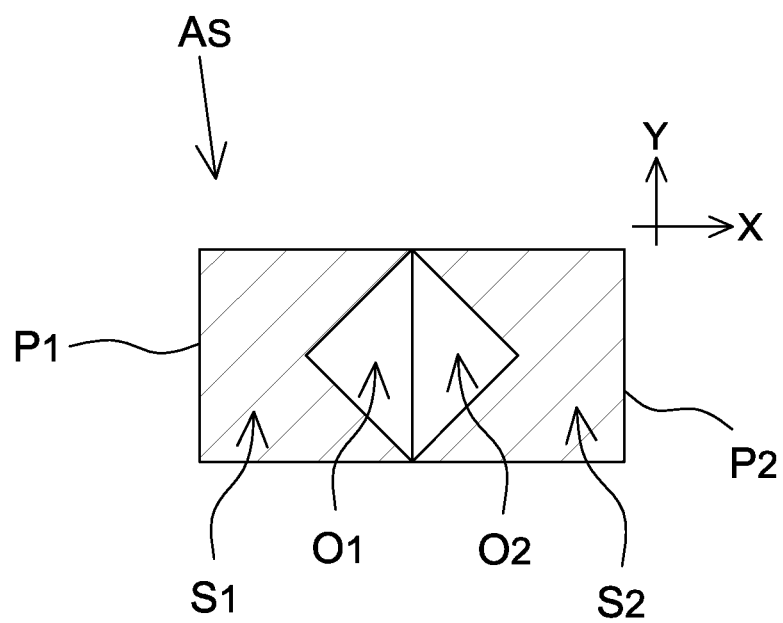
FIG. 2B is a partially enlarged view of FIG. 2A.

Referring to FIGS. 1, 2A and 2B, every component of each of the sensing pixel areas As is illustrated hereinafter. FIG. 2A is a top view of the sensing element 12 of FIG. 1, wherein the at least one micro lens $L_M$ is not shown in FIG. 2A. As shown in FIG. 2A, the second pixel $P_2$ is adjacent to the first pixel $P_1$ in a predetermined direction (e.g. an x direction) in this embodiment. In addition, in this embodiment, a shape of the first pixel $P_1$ and the second pixel $P_2$ is shown as a square, but not limited thereto. In other embodiments, a shape of the first pixel $P_1$ and the second pixel $P_2$ is a circle or a rectangle. Although FIG. 2A shows that the sensing element 12 has 6×5 sensing pixel areas As, but the present disclosure is not limited thereto. A number of the sensing pixel areas As is determined according to actual applications.

FIG. 2B is a partial enlarged view of FIG. 2A, and in FIG. 2B one sensing pixel area As is shown. The first shielding layer $S_1$ is disposed upon the first pixel $P_1$ and has a first opening $O_1$, wherein an aperture of the first opening $O_1$ increases or monotonically increases along the predetermined direction from a center of the first pixel $P_1$. The second shielding layer $S_2$ is disposed upon the second pixel $P_2$ and has a second opening $O_2$, wherein a shape of the second opening $O_2$ is mirror symmetrical to that of the first opening $O_1$ along the predetermined direction (e.g. the X direction). That is, an aperture of the second opening $O_2$ increases along an inverse direction of the predetermined direction from a center of the second pixel $P_2$. It should be mentioned that the first shielding layer $S_1$ and the second shielding layer $S_2$ are used to block a part of light penetrating the micro lens $L_M$. The other part of light not being blocked propagates through the first opening $O_1$ of the first shielding layer $S_1$ and the second opening $O_2$ of the second shielding layer $S_2$ and reaches the first pixel $P_1$ and the second pixel $P_2$.

It is appreciated that, in FIG. 2B, a first area summation of the first shielding layer $S_1$ and the first opening $O_1$ is equal to an area of the first pixel $P_1$, and a second area summation of the second shielding layer $S_2$ and the second opening $O_2$ is equal to an area of the second pixel $P_2$, but not limited to. In other embodiments, the first area summation is a little larger than the area of the first pixel $P_1$ and the second area summation is a little larger than the area of the second pixel $P_2$ to avoid light leakage.

The first shielding layer $S_1$ and the second shielding layer $S_2$ are selected from two layers of the first metal layer to the tenth metal layer in the CMOS manufacturing process, or made of other light shielding material.

In one embodiment, after the first shielding layer $S_1$ and the second shielding layer $S_2$ are formed, e.g., made of metal material, an isolation layer or a passivation layer is optionally covered on the first shielding layer $S_1$ and the second shielding layer $S_2$. In this case, the isolation layer or the passivation layer is preferably made of light transmissive material such that the first opening $O_1$ and the second opening $O_2$ have a high light transmission rate. It is appreciated that the isolation layer or the passivation layer is able to prevent dust from entering the first pixel $P_1$ and the second pixel $P_2$ to degrade the light sensitivity.

In this embodiment, although FIG. 1 shows that the first shielding layer $S_1$ and the second shielding layer $S_2$ are separated from the first pixel $P_1$ and the second pixel $P_2$ by a distance (e.g. via the isolation layer or the passivation layer), the first shielding layer $S_1$ and the second shielding layer $S_2$ are preferably close to the first pixel $P_1$ and the second pixel $P_2$ as much as possible. In other embodiments, the first shielding layer $S_1$ and the second shielding layer $S_2$ are directly coated on or laid over the first pixel $P_1$ and the second pixel $P_2$, respectively.

The at least one micro lens $L_M$ is disposed between the lens 10 and the first shielding layer $S_1$ as well as the second shielding layer $S_2$. As shown in FIG. 1, for example each of the sensing pixel areas As includes two micro lenses $L_M$, and the two micro lenses $L_M$ are respectively aligned with the first pixel $P_1$ and the second pixel $P_2$. In this case, through the arrangement of the two micro lenses $L_M$ as well as the first opening $O_1$ and the second opening $O_2$ being mirror symmetrical to each other, the first pixel $P_1$ and the second pixel $P_2$ respectively receive incident light beams of different phases for the phase detection.

It should be mentioned that through the above arrangement of the micro lens and the opening, when the first pixel $P_1$ and the second pixel $P_2$ receives incident light beams, received incident light closing to a center of the first pixel $P_1$ and received incident light closing to a center of the second pixel $P_2$ do not have an obvious phase difference from each other. On the contrary, received incident light closing to an edge (e.g. a right edge in FIG. 2B) of the first pixel $P_1$ and received incident light closing to an edge (e.g. a left edge in FIG. 2B) of the second pixel $P_2$ have a larger phase difference from each other. Therefore, corresponding to the first opening $O_1$, the aperture of the first opening $O_1$ closing to the edge of the first pixel $P_1$ is preferably larger than the aperture of the first opening $O_1$ closing to the center of the first pixel $P_1$. That is, the aperture of the first opening $O_1$ increases along the predetermined direction from the center of the first pixel $P_1$. In this way, the accuracy of phase detection is increased.

It is appreciated that as the aperture of the first opening $O_1$ increases along the predetermined direction from the center of the first pixel $P_1$, an area of the first opening $O_1$ is smaller than a half area of the first pixel $P_1$, as shown in FIG. 2B.

Meanwhile, areas of the first opening $O_1$ and the second opening $O_2$ are larger than a predetermined area such that the image frame IF captured by the sensing element 12 has an acceptable signal to noise ratio (SNR). Preferably, an area of the first opening $O_1$ is 5 to 45 percent of an area of the first pixel $P_1$.

Figure 3:
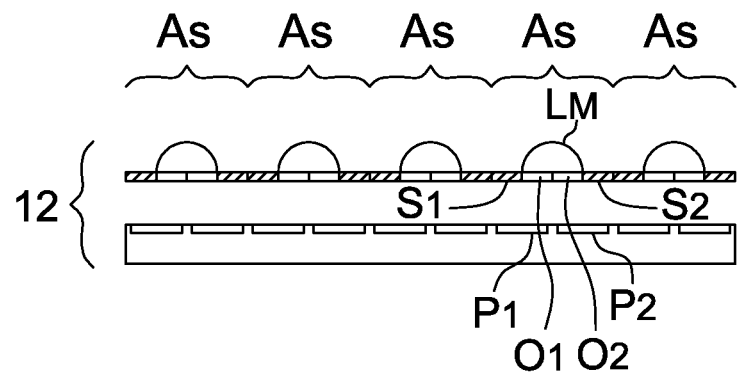
FIG. 3 is a schematic diagram of a sensing element of an optical distance measurement system according to one embodiment of the present disclosure.

As the micro lens $L_M$ has a symmetrical structure, in other embodiments each of the sensing pixel areas As includes only one micro lens $L_M$. In this case, the one micro lens $L_M$ is aligned with both of the first opening $O_1$ and the second opening $O_2$, as shown in FIG. 3. In addition, a passivation layer is optionally formed between the micro lenses $L_M$ and the shielding layers.

Figure 4:
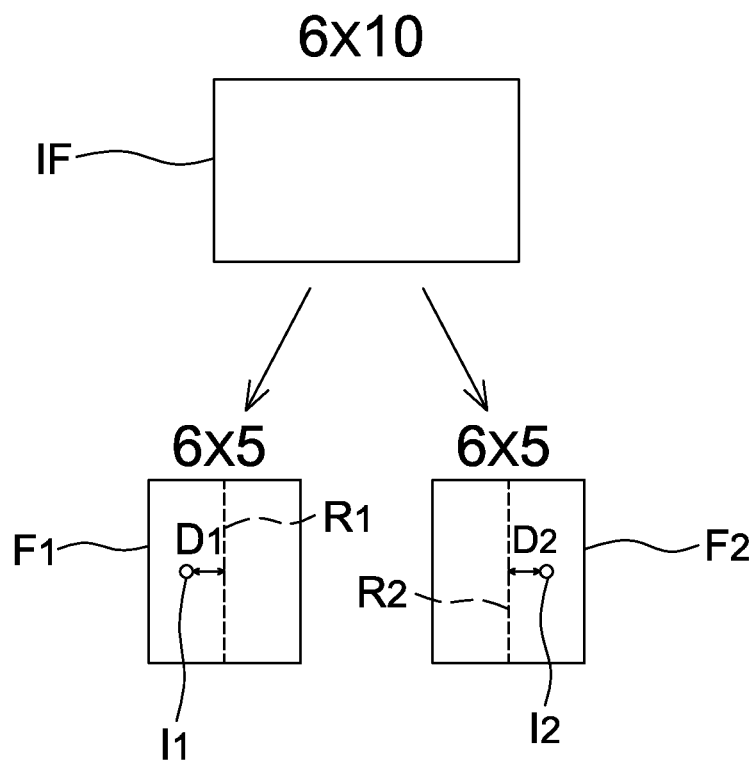
FIG. 4 is a schematic diagram of estimating an object distance according to an image frame by a processing unit according to a first embodiment of the present disclosure.

Referring to FIGS. 1, 2A and 4, FIG. 4 is a schematic diagram of estimating an object distance according to an image frame IF by a processing unit 14. The processing unit 14 is, e.g., a digital signal processor (DSP) or a processing circuit, and electrically coupled to the sensing element 12. After the sensing element 12 outputs the image frame IF (e.g. corresponding to the 6×10 pixel matrix shown in FIG. 2A) to the processing unit 14, the processing unit 14 generates, according to the image frame IF, a first subframe $F_1$ corresponding to the first pixels $P_1$ and a second subframe $F_2$ corresponding to the second pixels $P_2$. For example, when the image frame IF corresponds to the 6×5 sensing pixel areas As of the sensing element 12 (i.e. the 6×10 pixel matrix) of FIG. 2A, gray level information of the 6×5 first pixels $P_1$ and the 6×5 second pixels $P_2$ are used to form the first subframe $F_1$ and the second subframe $F_2$, respectively.

Generally, when the object 9 is in focus with respect to the optical distance measurement system 1, a clear object image appears in the image frame IF captured by the sensing element 12. Meanwhile, corresponding imaging positions of the object 9 in the first subframe $F_1$ and in the second subframe $F_2$ generated according to the image frame IF are substantially identical. That is, when the imaging positions of the object 9 respectively present in the first subframe $F_1$ and the second subframe $F_2$ are overlapped (e.g. a distance therebetween is 0), a linear distance between the object 9 and the optical distance measurement system 1 is defined as a reference distance L0 herein.

However, when the object 9 is out of focus with respect to the optical distance measurement system 1, two object images are present in the image frame IF captured by the sensing element 12, and the two object images are at a first imaging position $I_1$ in the first subframe $F_1$ and at a second imaging position $I_2$ in the second subframe $F_2$, as shown in FIG. 4. In this case, for example a center line in the first subframe $F_1$ perpendicular to the predetermined direction is defined as a first reference line $R_1$ and for example a center line in the second subframe $F_2$ perpendicular to the predetermined direction is defined as a second reference line $R_2$. Then, the processing unit 14 calculates a first projective distance $D_1$ between the first imaging position $I_1$ and the first reference line $R_1$ and calculates a second projective distance $D_2$ between the second imaging position $I_2$ and the second reference line $R_2$.

It should be mentioned that the reference distance L0 is assumed to be known when the first imaging position $I_1$ and the second imaging position $I_2$ are overlapped, and in this case the first projective distance $D_1$ and the second projective distance $D_2$ are both 0 if the object image is at the center of the image frame IF. As a distance of the object 9 from the optical distance measurement system 1 has a predetermined relationship, e.g. a linear or nonlinear relationship, with respect to the first projective distance $D_1$ of the first imaging position $I_1$ generated by the object 9 in the first subframe $F_1$ (or the second projective distance $D_2$ of the second imaging position $I_2$ generated by the object 9 in the second subframe $F_2$), the optical distance measurement system 1 previously stores the reference distance L0 and the predetermined relationship in a storage memory. Accordingly, the processing unit 14 is able to estimate at least one object distance (i.e. the distance of the object 9 from the optical distance measurement system 1) according to the first imaging position $I_1$ and the second imaging position $I_2$.

In one embodiment, the processing unit 14 estimates the at least one object distance according to a difference value between the first projective distance $D_1$ and the second projective distance $D_2$ (e.g., $D_1-D_2$). For example, a look-up table, e.g. shown in Table 1 below (wherein the object distance L2>L0>L1), is previously formed according to a relationship of the difference value with respect to the distance of the object 9 from the optical distance measurement system 1 to be previously stored in the storage memory.

TABLE 1

| first projective distance $D_1$ | second projective distance $D_2$ | difference value $(D_1 - D_2)$ | object distance |
|---|---|---|---|
| 0 | 0 | 0 | L0 |
| −1 | +1 | −2 | L1 |
| +1 | −1 | 2 | L2 |

In another embodiment, the relationship of the difference value with respect to the distance between the object 9 and the optical distance measurement system 1 is formed as a linear equation mathematically to be previously stored in the storage memory, but not limited thereto. In brief, the processing unit 14 of the optical distance measurement system 1 of this embodiment calculates at least one object distance according to the first imaging position $I_1$ of the first subframe $F_1$ and the second imaging position $I_2$ of the second subframe $F_2$. Compared with the conventional distance measurement system (DMS) which requires lighting, the lighting is not necessary in the optical distance measurement system 1 of this embodiment and the object distance is detectable using a less number of first pixels $P_1$ and second pixels $P_2$ such that this embodiment has the advantages of low cost and small size.

Figure 5A:
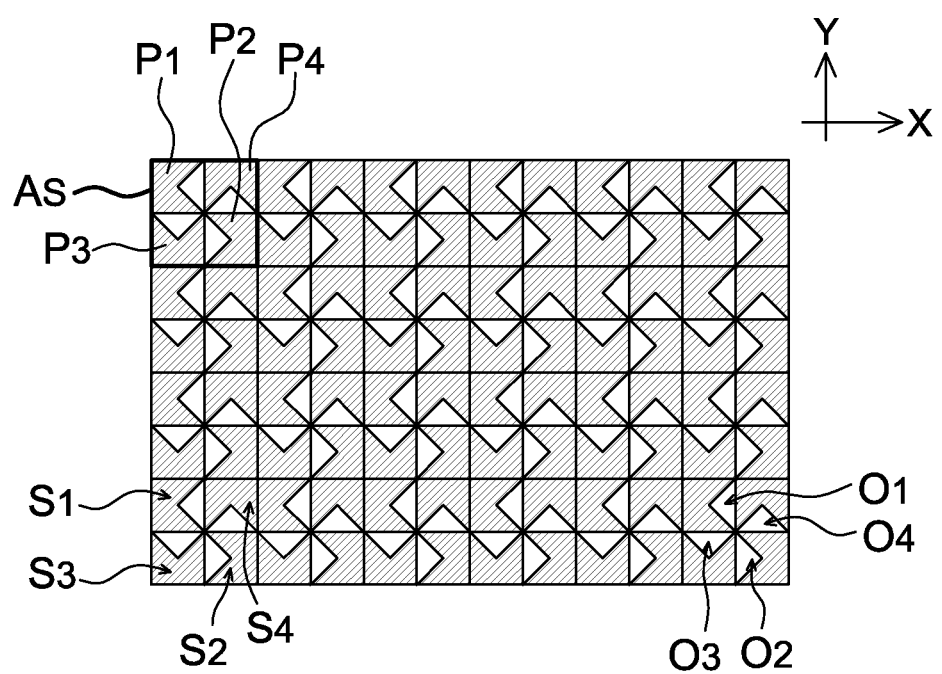
FIG. 5A is a top view of a sensing element of an optical distance measurement system according a second embodiment of the present disclosure.
Figure 5B:
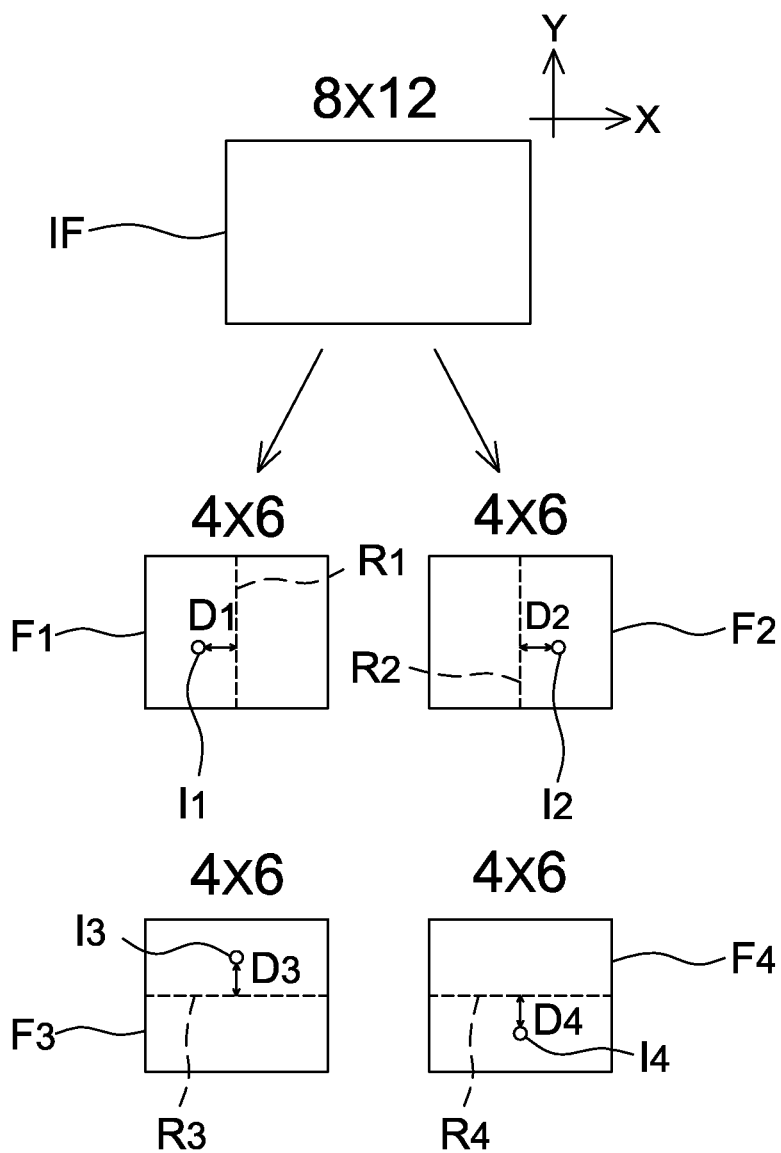
FIG. 5B is a schematic diagram of estimating an object distance according to an image frame by a processing unit according to a second embodiment of the present disclosure.

Compared with the first embodiment of the present disclosure in which the sensing pixel area As includes two mirror symmetrical pixels (e.g. the first pixel $P_1$ and the second pixel $P_2$), the sensing pixel area As of the second embodiment of the present disclosure includes more than two pixels, e.g., including four pixels. Referring to FIGS. 1, 5A and 5B, FIG. 5A is a top view of a sensing element according a second embodiment of the present disclosure, and FIG. 5B is a schematic diagram of estimating an object distance according to an image frame by a processing unit according to a second embodiment of the present disclosure. An optical distance measurement system 1 of the second embodiment of the present disclosure includes a lens 10, a sensing element 12 and a processing unit 14, wherein the function of the lens 10 has been described in the first embodiment and thus details thereof are not repeated herein.

The sensing element 12 is used to sense light penetrating the lens 10 and output an image frame (e.g. an image frame IF shown in FIG. 5B, the image frame IF corresponding to a 8×12 pixel matrix of FIG. 5A). The sensing element 12 includes a plurality of sensing pixel areas As arranged in a matrix, wherein each of the sensing pixel areas As includes a first pixel $P_1$, a second pixel $P_2$, a third pixel $P_3$ and a fourth pixel $P_4$, as shown in FIG. 5A.

Each of the sensing pixel areas As further includes a first shielding layer $S_1$, a second shielding layer $S_2$, a third shielding layer $S_3$ and a fourth shielding layer $S_4$. The first shielding layer $S_1$ is disposed upon the first pixel $P_1$ and has a first opening $O_1$, wherein an aperture of the first opening $O_1$ increases or monotonically increases along a first direction (e.g. an x direction) from a center of the first pixel $P_1$. The second shielding layer $S_2$ is disposed upon the second pixel $P_2$ and has a second opening $O_2$, wherein a shape of the second opening $O_2$ is mirror symmetrical to that of the first opening $O_1$ in the first direction. The third shielding layer $S_3$ is disposed upon the third pixel $P_3$ and has a third opening $O_3$, wherein an aperture of the third opening $O_3$ increases or monotonically increases along a second direction (e.g. a y direction) from a center of the third pixel $P_3$. The fourth shielding layer $S_4$ is disposed upon the fourth pixel $P_4$ and has a fourth opening $O_4$, wherein a shape of the fourth opening $O_4$ is mirror symmetrical to that of the third opening $O_3$ in the second direction.

In this embodiment, the first direction (e.g. the x direction) is perpendicular to the second direction (e.g. the y direction), but not limited thereto.

Then, four micro lenses (not shown) are respectively disposed between the lens 10 and the first shielding layer $S_1$, the second shielding layer $S_2$, the third shielding layer $S_3$ as well as the fourth shielding layer $S_4$, e.g., respectively arranged upon the shielding layer $S_1$ to $S_4$ and aligned with the first pixel $P_1$, the second pixel $P_2$, the third pixel $P_3$ and the fourth pixel $P_4$, wherein the micro lenses in this embodiment have the same function as the micro lenses $L_M$ of the first embodiment and thus details thereof are not repeated herein.

It should be mentioned that the first opening $O_1$ and the second opening $O_2$ of this embodiment respectively have identical shapes and functions to the first opening $O_1$ and the second opening $O_2$ of the first embodiment. However, different from the first embodiment, the sensing pixel area As of this embodiment further includes the third opening $O_3$, the fourth opening $O_4$ and corresponded pixels and shielding layers. It is appreciated that after the third shielding layer $S_3$ and the fourth layer $S_4$ are counterclockwise rotated about the sensing pixel area As by 90 degrees, the rotated third shielding layer $S_3$ and the rotated fourth shielding layer $S_4$ respectively have an identical shape to the first shielding layer $S_1$ and the second shielding layer $S_2$. Meanwhile, the rotated third opening $O_3$ and the rotated fourth opening $O_4$ respectively have an identical shape to the first opening $O_1$ and the second opening $O_2$. Accordingly, the third opening $O_3$ and the fourth opening $O_4$ have the same function, in the second direction, as the first opening $O_1$ and the second opening $O_2$ in the first direction.

Next, in addition to generating a first subframe $F_1$ corresponding to the first pixels $P_1$ and a second subframe $F_2$ corresponding to the second pixels $P_2$ according to the image frame IF, the processing unit 14 further generates a third subframe $F_3$ corresponding to the third pixels $P_3$ and a fourth subframe $F_4$ corresponding to the fourth pixels $P_4$ according to the image frame IF, and estimates at least two object distances according to a first imaging position $I_1$ of the first subframe $F_1$, a second imaging position $I_2$ of the second subframe $F_2$, a third imaging position $I_3$ of the third subframe $F_3$ and a fourth imaging position $I_4$ of the fourth subframe $F_4$.

For example, the first subframe $F_1$ and the second subframe $F_2$ respectively have a center line perpendicular to the first direction (e.g. the x direction) to be defined as a first reference line $R_1$ and a second reference line $R_2$, respectively. The third subframe $F_3$ and the fourth subframe $F_4$ respectively have a center line perpendicular to the second direction (e.g. the y direction) to be defined as a third reference line $R_3$ and a fourth reference line $R_4$, respectively. The processing unit 14 then calculates a first projective distance $D_1$ between the first imaging position $I_1$ and the first reference line $R_1$, calculates a second projective distance $D_2$ between the second imaging position $I_2$ and the second reference line $R_2$, calculates a third projective distance $D_3$ between the third imaging position $I_3$ and the third reference line $R_3$ and calculates a fourth projective distance $D_4$ between the fourth imaging position $I_4$ and the fourth reference line $R_4$, and estimates the at least two object distances according to a first difference value between the first projective distance $D_1$ and the second projective distance $D_2$ and according to a second difference value between the third projective distance $D_3$ and the fourth projective distance $D_4$, wherein the method of the processing unit 14 estimating the object distance has been described in the first embodiment and FIG. 4, and thus details thereof are not repeated herein.

In addition, as the third shielding layer $S_3$ and the first shielding layer $S_1$ of the sensing element 12 have an identical shape, a third opening $O_3$ of the third shielding layer $S_3$ has an identical shape and area as a first opening O1 of the first shielding layer $S_1$, e.g., a triangle shown in FIG. 5A, but not limited thereto. In one embodiment, the first opening $O_1$ and the third opening $O_3$ have an identical area but different shapes, e.g., the first opening $O_1$ being a trapezoid and the second opening $O_2$ being a semicircle, and the trapezoid and the semicircle have an identical area.

Figure 6A:
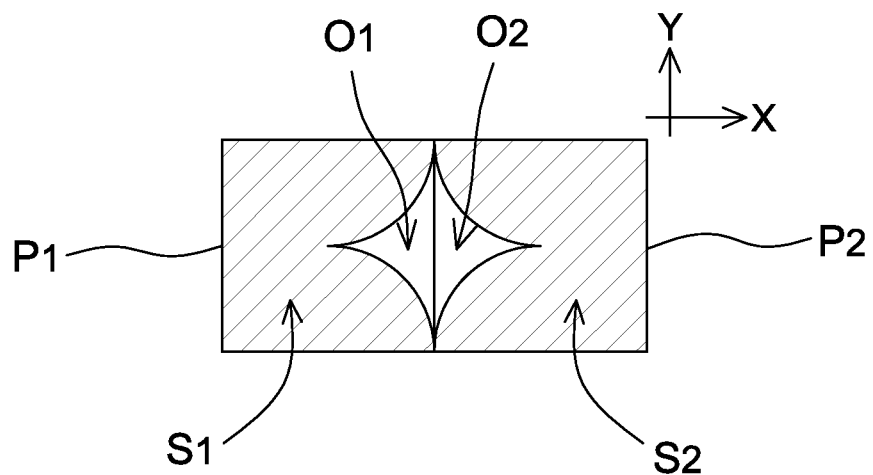
FIGS. 6A-8B are schematic diagrams of sensing pixel areas having openings of different shapes.
Figure 6B:
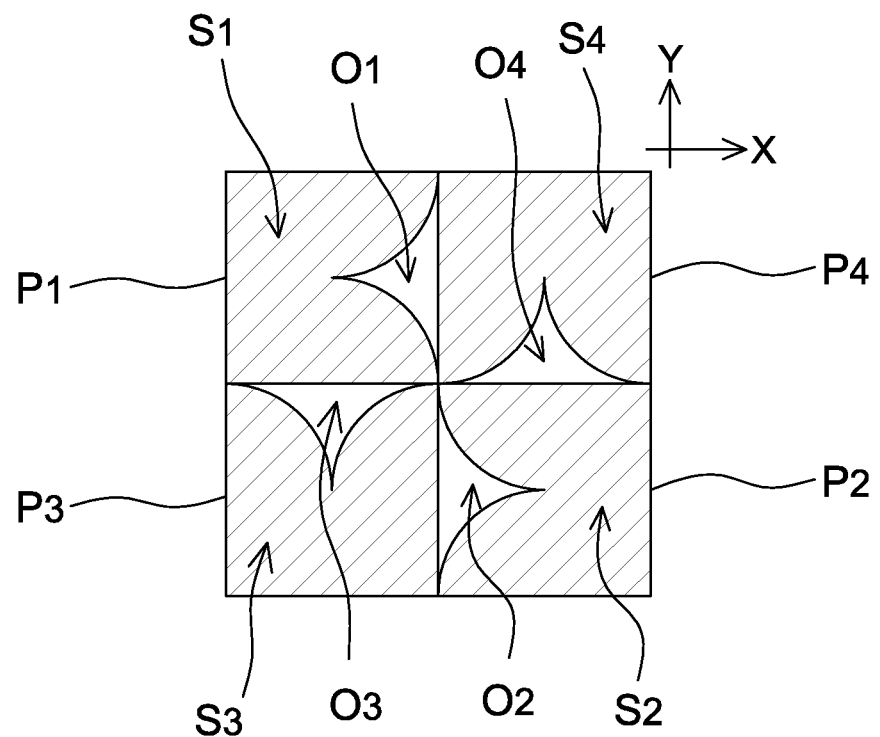

In the embodiment of the present disclosure, a shape of the opening included in the shielding layer of the sensing pixel areas does not have particular limitations as long as an aperture of the opening increases along a predetermined direction from a corresponded pixel center. For example in FIG. 6A, an aperture of the first opening $O_1$ exponentially increases along a first direction (e.g. the X direction) from a center of the first pixel $P_1$. It is appreciated that as the second opening $O_2$ is mirror symmetrical to the first opening $O_1$ along the first direction, an aperture of the second opening $O_2$ exponentially increases along an inverse of the first direction (e.g. the −X direction) from a center of the second pixel $P_2$. Furthermore, when the sensing pixel area includes four sensing pixels as shown in FIG. 6B, an aperture of the third opening $O_3$ exponentially increases along a second direction (e.g. the Y direction) from a center of the third pixel $P_3$, and an aperture of the fourth opening $O_4$ exponentially increases along an inverse of the second direction (e.g. the −Y direction) from a center of the fourth pixel $P_4$.

Figure 7A:
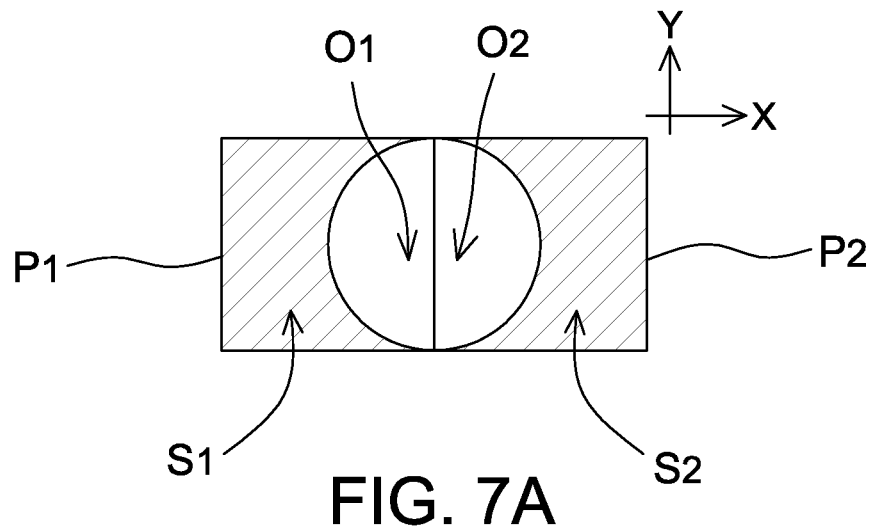
Figure 7B:
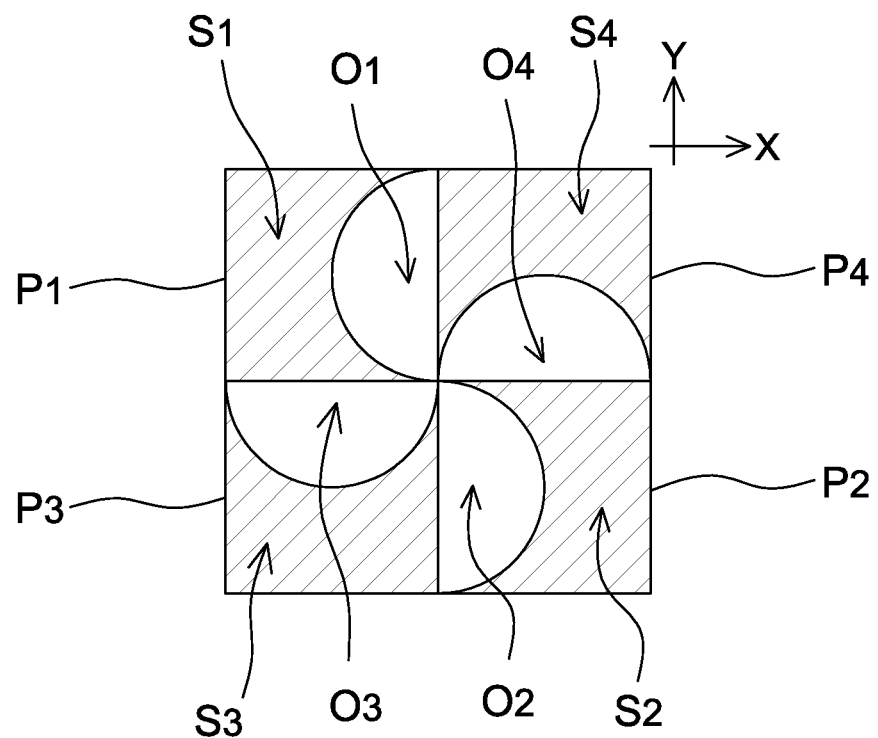

In one embodiment, a shape of the first opening $O_1$, the second opening $O_2$, the third opening $O_3$ and the fourth opening $O_4$ is a semicircle as shown in FIGS. 7A and 7B.

Figure 8A:
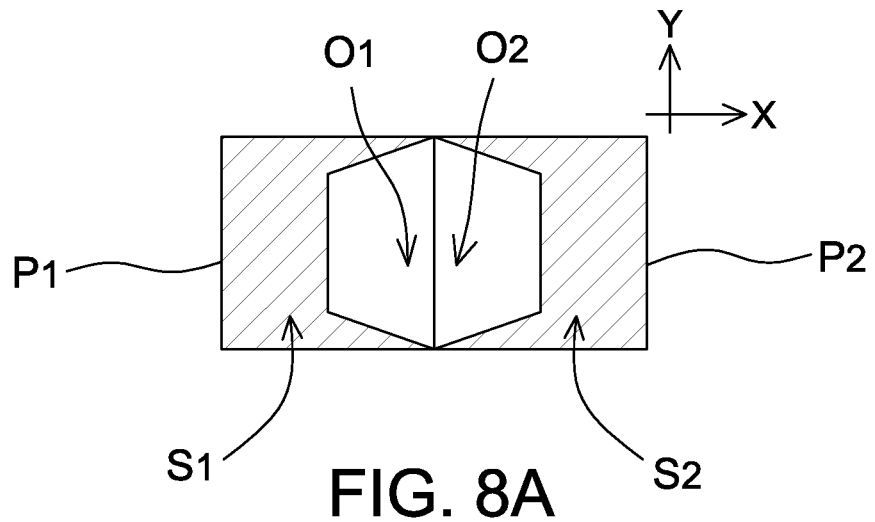
Figure 8B:
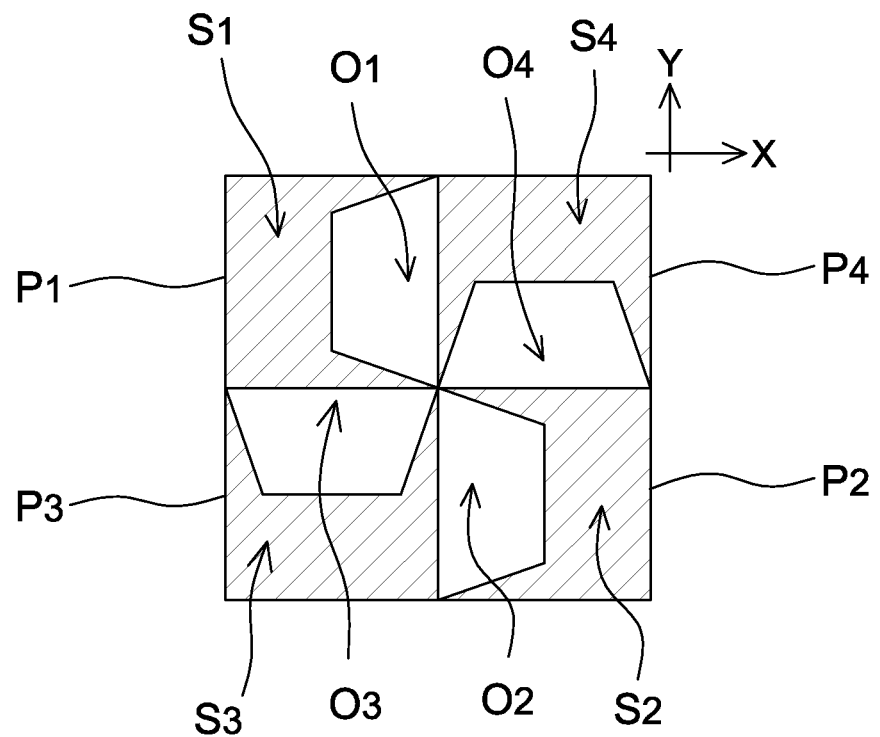

In one embodiment, a shape of the first opening $O_1$, the second opening $O_2$, the third opening $O_3$ and the fourth opening $O_4$ is a trapezoid as shown in FIGS. 8A and 8B.

In the present disclosure, each of the sensing pixel areas As (e.g. including the first pixel $P_1$, the second pixel $P_2$, the third pixel $P_3$ and the fourth pixel $P_4$) is the light sensing pixel manufactured independently or light sensing pixels adjacent or non adjacent to each other in a same pixel matrix without particular limitations. In some embodiments, a part of pixels in a pixel matrix are selected as the sensing pixel areas As and the other pixels of the pixel matrix perform other functions.

Figure 9:
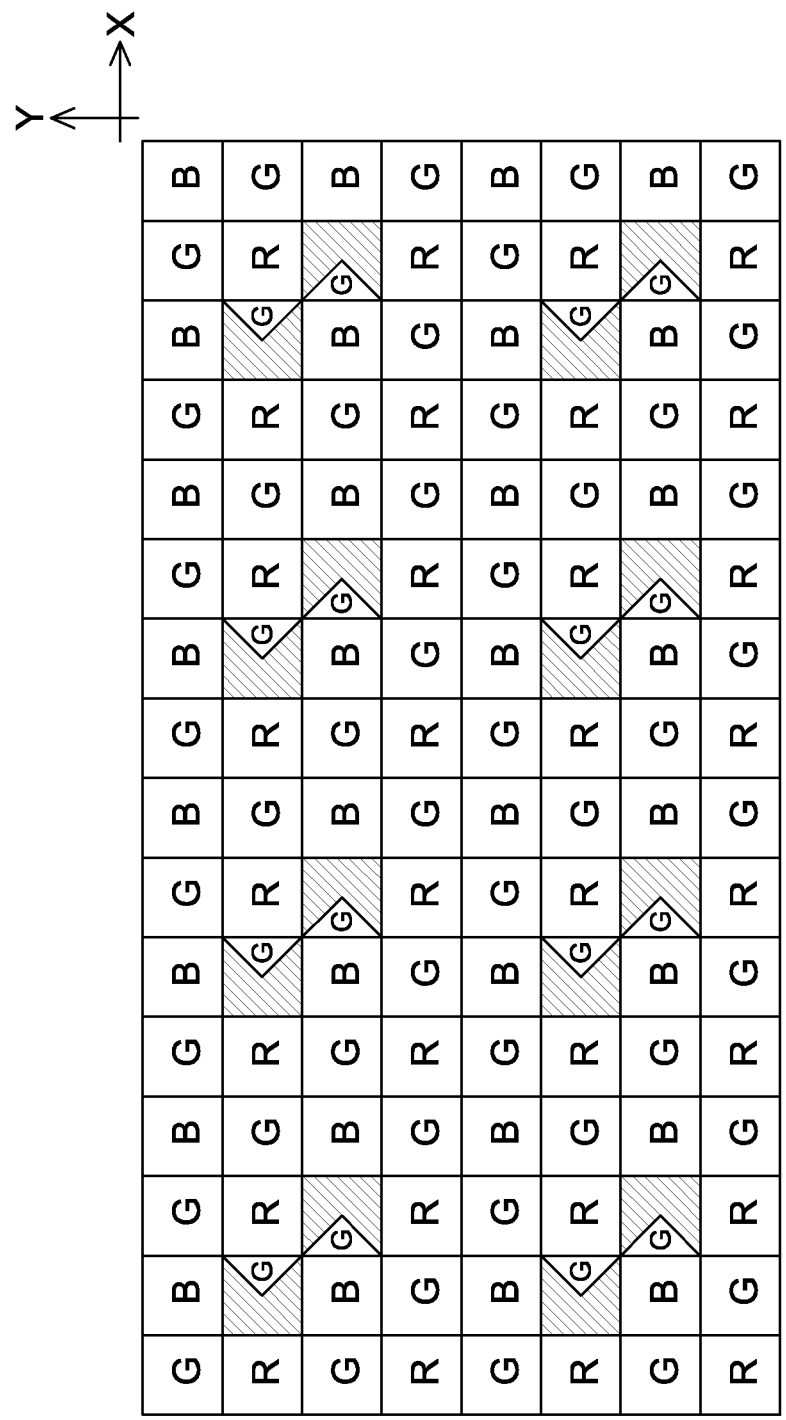
FIG. 9 is a top view of a sensing element of an optical distance measurement system according a third embodiment of the present disclosure.

For example referring to FIG. 9, a sensing element includes three types of sensing pixels including red pixels (R), green pixels (G) and blue pixels (B) is shown. A part of the G pixels are respectively disposed with a shielding layer and a micro lens thereupon, wherein the shielding layer includes an opening (e.g. triangular first opening $O_1$ and second opening $O_2$ in the first embodiment of the present disclosure). The other part of the G pixels, the R pixels and the B pixels are not disposed with the shielding layer and the micro lens thereupon. In this case, the part of the G pixels are used to capture the image frame containing information of object depth, and the other pixels are used to capture the image frame containing information of two-dimensional image.

In addition, the optical distance measurement system 1 of the present disclosure is able to estimate the position of the object 9 using a few sensing pixels (e.g. the first pixel $P_1$ and the second pixel $P_2$). In other words, if the optical distance measurement system 1 of the present disclosure includes a large number of sensing pixels, e.g. a sensing pixel matrix including 300×300, 600×600 or 900×900 pixels, more position information of the object 9 is obtainable to be used to construct a three dimensional image of the object 9.

It should be mentioned that values in the above embodiments, e.g. the projective distances and different values, are only intended to illustrate but not to limit the present disclosure.

As mentioned above, the conventional distance measurement system and the gesture recognition system need a higher cost and size, and generally an additional light source is required. Therefore, the present disclosure provides a sensing element and an optical distance measurement system (FIG. 1) that capture images with mirror symmetrical sensing pixels to perform the phase detection so as to identify the two-dimensional position, the three-dimensional position and the position variation of an object, and have the advantages of low cost and small size since a light source is not required.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A sensing element, comprising:
a plurality of sensing pixel areas, wherein each of the sensing pixel areas comprises:
a first pixel;
a second pixel adjacent to the first pixel;
a first shielding layer disposed upon the first pixel and having a first opening, wherein an aperture of the first opening increases along a predetermined direction from a center of the first pixel;
a second shielding layer disposed upon the second pixel and having a second opening, wherein a shape of the second opening is mirror symmetrical to that of the first opening along the predetermined direction; and
at least one micro lens disposed upon the first shielding layer and the second shield layer,
wherein the first pixel and the second pixel respectively receive incident light beams of different phases, and
a shape of each of the first opening and the second opening is a triangle, and a corner of the triangle is respectively at the center of the first pixel and a center of the second pixel.

2. The sensing element as claimed in claim 1, wherein the first shielding layer and the second shielding layer are directly coated on or laid over the first pixel and the second pixel, respectively.

3. The sensing element as claimed in claim 1, wherein an area of the first opening is 5 to 45 percent of that of the first pixel.

4. The sensing element as claimed in claim 1, wherein the aperture of the first opening exponentially increases along the predetermined direction from the center of the first pixel.

5. The sensing element as claimed in claim 1, wherein the first pixel and the second pixel are respectively aligned with one micro lens.

6. The sensing element as claimed in claim 1, wherein a part of the first pixel and a part of the second pixel are covered by a same micro lens.

7. The sensing element as claimed in claim 1, wherein
a first area summation of the first shielding layer and the first opening is larger than an area of the first pixel, and
a second area summation of the second shielding layer and the second opening is large than an area of the second pixel.

8. The sensing element as claimed in claim 1, wherein the first shielding layer and the second shielding layer are selected from two metal layers in the CMOS manufacturing process.

9. The sensing element as claimed in claim 1, wherein the second pixel is a diagonal pixel of the first pixel.

10. An optical distance measurement system, comprising:
a lens;
a sensing element configured to sense light penetrating the lens and output an image frame, and comprising a plurality of sensing pixel areas, wherein each of the sensing pixel areas comprises:
a first pixel and a second pixel;
a first shielding layer disposed upon the first pixel and having a first opening, wherein an aperture of the first opening increases along a first direction from a center of the first pixel;
a second shielding layer disposed upon the second pixel and having a second opening, wherein an aperture of the second opening increases along an inverse direction of the first direction from a center of the second pixel; and
at least one micro lens disposed between the lens and the first shielding layer as well as the second shielding layer; and
a processing unit configured to
generate, according to the image frame, a first subframe corresponding to the first pixels and a second subframe corresponding to the second pixels, and
estimate a plurality of distances of different positions, according to the first subframe and the second subframe, on a surface of an object to obtain a three-dimensional image of the object.

11. The optical distance measurement system as claimed in claim 10, wherein each of the sensing pixel areas comprises one micro lens which is aligned with both of the first opening and the second opening.

12. The optical distance measurement system as claimed in claim 10, wherein each of the sensing pixel areas comprises two micro lenses each being aligned with one of the first opening and the second opening.

13. The optical distance measurement system as claimed in claim 10, wherein the first shielding layer and the second shielding layer are respectively coated on or laid over the first pixel and the second pixel.

14. The optical distance measurement system as claimed in claim 10, wherein an area of the first opening is 5 to 45 percent of that of the first pixel.

15. The optical distance measurement system as claimed in claim 10, wherein a shape of the first opening and the second opening is a triangle, a trapezoid or a semicircle.

16. The optical distance measurement system as claimed in claim 10, wherein the aperture of the first opening exponentially increases along the first direction from the center of the first pixel, and the aperture of the second opening exponentially increases along the inverse direction of the first direction from the center of the second pixel.

17. The optical distance measurement system as claimed in claim 10, wherein the processing unit is further configured to
- calculate a first projective distance from a first imaging position to a first reference line in the first subframe corresponding to each of the sensing pixel areas,
- calculate a second projective distance from a second imaging position to a second reference line in the second subframe corresponding to each of the sensing pixel areas, and
- estimate the plurality of distances according to a difference value of the first projective distance and the second projective distance corresponding to each of the sensing pixel areas.

18. The optical distance measurement system as claimed in claim 10, wherein each of the sensing pixel areas further comprises:
- a third pixel and a fourth pixel;
- a third shielding layer disposed upon the third pixel and having a third opening, wherein an aperture of the third opening increases along a second direction from a center of the third pixel; and
- a fourth shielding layer disposed upon the fourth pixel and having a fourth opening, wherein an aperture of the fourth opening increases along an inverse direction of the second direction from a center of the fourth pixel, wherein
- the processing unit is further configured to generate, according to the image frame, a third subframe corresponding to the third pixels and a fourth subframe corresponding to the fourth pixels.

19. The optical distance measurement system as claimed in claim 18, wherein
the second pixel is a diagonal pixel of the first pixel, and
the third pixel is a diagonal pixel of the fourth pixel.

* * * * *